United States Patent [19]

Friedman

[11] 4,043,831
[45] Aug. 23, 1977

[54] DENSIFICATION OF COAL FLY ASH

[75] Inventor: Louis D. Friedman, New Brunswick, N.J.

[73] Assignee: Cogas Development Co., Princeton, N.J.

[21] Appl. No.: 593,921

[22] Filed: July 7, 1975

[51] Int. Cl.$^2$ ............................................. C04B 31/00
[52] U.S. Cl. .......................... 106/288 B; 106/DIG. 1; 75/5; 75/25
[58] Field of Search ..................... 106/288 B, DIG. 1; 75/5, 25

[56] References Cited

U.S. PATENT DOCUMENTS

| | | | |
|---|---|---|---|
| 1,994,718 | 3/1935 | Lellep | 425/222 |
| 2,933,796 | 4/1960 | Somogyi | 106/DIG. 1 |
| 2,948,948 | 8/1960 | Duplin et al. | 106/DIG. 1 |
| 3,020,147 | 2/1962 | Boss et al. | 75/5 |
| 3,313,617 | 4/1967 | Ban et al. | 75/5 |
| 3,314,780 | 4/1967 | Holowaty et al. | 75/5 |
| 3,374,101 | 3/1968 | Ban et al. | 106/288 B |
| 3,669,703 | 6/1972 | Pennachetti et al. | 106/DIG. 1 |
| 3,802,864 | 4/1974 | Kusama et al. | 75/5 |

*Primary Examiner*—Patrick P. Garvin
*Assistant Examiner*—John P. Sheehan
*Attorney, Agent, or Firm*—Robert D. Jackson

[57] ABSTRACT

Densified fly ash pellets are produced by the steps comprising:
  a. Sizing the fly ash to produce a fraction substantially finer than —200 mesh (U.S. Standard);
  b. Moistening the sized fraction with sufficient water to form green pellets;
  c. Sizing the green pellets;
  d. Tumbling the sized green pellets to effect particle packing until excess water has been squeezed out, said pellets being kept dusted during tumbling with sized fly ash from step (a) to absorb the squeezed out water and thereby prevent agglomeration;
  e. Drying the packed green pellets to remove the free water therefrom;
  f. Heating the dried pellets from about 1000° F to within about 70 – 90% of the absolute softening temperature of the ash and;
  g. Sintering the pellets from (f) at a temperature of 70 to 90% of the absolute softening temperature of the ash.

The densified fly ash pellets constitute a low cost particulate heat exchange material for supplying heat to a fluidized bed carbon gasification zone.

6 Claims, No Drawings

DENSIFICATION OF COAL FLY ASH

This invention relates to the utilization of fly ash. In particular, the invention is concerned with a process of densifying fly ash and to densified pellets produced thereby.

In U.S. Pat. No. 3,850,839 is described a process of generating synthesis gas by passing steam through a fluidized bed of carbonaceous solids. Synthesis gas is a mixture of hydrogen and carbon monoxide and its formation from carbon and steam, known as the water gas reaction, can be depicted by the following idealized equation.

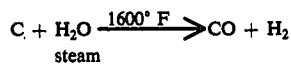

$$C + H_2O \xrightarrow[\text{steam}]{1600° F} CO + H_2$$

On catalytic treatment at high temperature, synthesis gas is converted into methane or SN (substitute natural gas) as it has come to be known in the energy and fuel arts. Such technology is under intense investigation as part of an overall effort to develop a practical system of coal gasification.

In carrying out the process of the cited patent, the highly endothermic steam carbon reaction is sustained by a stream of heated pellets raining down through the gasification zone from whence they are conveyed to a fluidized heating zone supplied with hot combustion gases and the reheated pellets then returned to the gasifier and so on in a continuous recycle loop. These pellets are hard, refractory particles of sufficient density whereby they are not fluidized in the gasification zone but pass downward through the fluidizing medium while transferring their heat content to the gasification medium. The pellets are desirably spheres having a density of from about minus ¼ inch to about minus ½ inch, preferably about minus ⅜ inch. Moreover, it is essential that the pellets exhibit other qualities such as a specific heat of about 0.230 to 0.275; specific gravity of from about 2.30 to 4.00; a melting or softening point above about 2000° F and resistance to spalling and attrition. Spalling refers to chipping or flaking of the pellets from thermal shock on contact with the hot gases in the combustor; attrition refers to abrasion of the pellets in their journey between and through the gasifier and combustor.

Although many refractory materials meet the requirements aforesaid, they are too costly for large scale gas generation. In fact, it is estimated that about 10 million pounds of pellets would be required to produce enough synthesis gas by fluidized gasification of carbon to provide, on methanation, 250 million cubic feet of (SNG) per day, which is the output of a minimum size commercial plant. This would require the daily handling of 25,000 tons of coal to provide sufficient carbon. The most economical source for the vast quantities of refractory material is the inorganic fly ash residue which remains after the carbonaceous reactant is consumed.

There have been proposals for utilizing hot particulate coal ash to supply heat to a synthesis gas generator of fluidized carbonaceous solids. Thus U.S. Pat. Nos. 2,654,665 to Phinney and 3,620,697 to Wunderlich disclose processes wherein a stream of hot particulate ash from the combustor is fed into the gasifier forming a mixture of fluidized ash and carbon. Difficulties arises, however, in separating the cooled ash from unreacted carbon since the buoyancy of the carbon and ash particles are about equal. This can be obviated by operating the combustor at sufficiently elevated temperature whereby the ash particles become tacky and adhere to one another to form heavy agglomerates as set forth in U.S. Pat. No. 3,171,369 to Stephens, Jr. However, the process is difficult to control, and the aggregates are too large for use as a particulate heat exchange medium.

Also disclosed in the art is a type of aggregated coal ash known as light weight aggregate. This material possesses an expanded or bloated structure and is formed by firing moist pellets of fly ash. A representative product and its manufacture are described in U.S. Pat. No. 3,328,180 to Ban. Although useful in concrete mixes and cinder blocks, light weight aggregate lacks the previously enunciated characteristics — high specific heat, resistance to spalling and attrition — required of a refractory for use as a heat exchange carrier in a fluidized steam-carbon gasifier.

In view of the foregoing, it is deemed that a satisfactory solution for making coal ash available as a heat carrier in a fluidized carbon gasifier has not previously been realized.

It has now been discovered that densified coal ash pellets, useful as the heat exchange carrier for supplying heat to a fluidized bed carbon gasifier, can be produced by a process comprising the steps of:

a. Sizing fly ash to produce a fraction substantially finer than −200 mesh;

b. Moistening the sized fraction with sufficient water to form green pellets;

c. Sizing the green pellets;

d. Tumbling the sized green pellets to effect particle packing until excess water has been squeezed out and the residual moisture is about 10 to 20%, said pellets being kept dusted during tumbling with −200 mesh fly ash from step (a) to absorb the squeezed out water and thereby prevent agglomeration;

e. Drying to remove the free water therefrom;

f. Presintering from about 1000° F to within about 70 − 90% of the absolute softening temperature of the ash; and g. Sintering at a temperature of 70 to 90% of the absolute softening temperature of the ash.

Fly ash is the air entrained inorganic ash residue from the burning of pulverized coal, such as in a fluidized bed power plant boiler. It is also formed in the fluidized gasification of coal-derived carbonaceous solids to produce synthesis gas by the water gas reaction. The chemical composition of fly ash commonly falls within the following ranges:

|  | Percent |
|---|---|
| Carbon (residual) | 0.1 − 16.0 |
| Silica | 37.0 − 60.0 |
| Alumina | 15.0 − 30.0 |
| Iron oxides | 5.0 − 20.0 |
| Sulfur | 0.0 − 3.0 |
| Basic oxides | 3.0 − 9.0 |

In carrying out the invention, green pellets are prepared from fly ash having a bulk density of about 1.0 to 1.4 and sized through a 25 mesh screen (U.S. Standard); the +25 mesh which is primarily clinker is discarded. The −25 mesh fraction is then crushed until substantially all material is finer than 200 mesh. In order to make the most dense heat carrier it is essential that the individual ash particles be packed as closely as possible prior to firing. In achieving this condition, one starts with finely divided fly ash. Of the material which passes through 200 mesh, it is desirable that 95% be finer than 325 mesh, and preferably 70% less than 10 - 20 microns, with a significant portion, about 10 - 15%, in the 5 micron range. Firm packing is enhanced by the presence of substances which promote slippage of the ash particles by increasing their lubricity. Examples of slippage agents include bentonite, kaolinite or other clay-like minerals, sodium silicate, carboxyvinyl polymers, rubber compounds and sodium aluminium phosphate. Where the fly ash contains appreciably more than about 7% free carbon, this must be removed; otherwise low density porous pellets will result. Essentially carbon free ash is readily obtained by heating the fly ash to redness (about 1400° F) in air to burn away residual carbon.

The sized ash aforesaid is sprayed with a fine mist of water at such a rate as to form green pellets while avoiding wet clump formation. A pelletizer is used in the aforedescribed operation. The green pellets consist of built up layers of the fly ash. In order to obtain a uniform product, the green pellets are sized to the desired diameter which is in the mesh range of 6 × 8 where the final densified pellets are to be used as a particulate heat enchange material in conjunction with a fluidized bed carbon gasifier. Oversized pellets from the sizing operation are dried, crushed and mixed with fresh −25 mesh ash and the mixture recycled for conversion into additional green pellets.

The sized green pellets are tumbled to squeeze out excess water and improve particle packing. About 5 to 10% by weight of dry crushed powder, having the same size consist as the charge, is added to the tumbler to dry the pellet surfaces that become moist by the squeezing out of the water. This prevents the formation of agglomerated pellets which have poor mechanical strength. Generally, the 6 × 8 mesh green pellets are tumbled with the excess dried fly ash for about 15 to 30 minutes after which the residual moisture is about 20 - 14% by weight.

Next, the pellets are sieved to separate fines, dried to remove free water, heat tempered from about 1000° F to within about 70 - 90% of the ash softening point and then sintered. The sintering is done at a temperature between about 70 to 90% of the absolute softening temperature of the ash but no lower than about 2260° R or 1800° F. For instance, ash from Illinois No. 6 coal softens in air at 2710° R to 2810° R (2250° to 2350° F) and pellets made therefrom are preferably sintered at about 2260° R to 2410° R (1900° 14 1950° F). Normally, the higher the sintering temperature, the stronger the pellet; but in no case should the temperature be high enough to cause pellet fusion. Sintering results in pellet shrinkage and concomitant increase in specific gravity, generally in excess of 2.0, usually about 2.2 to 2.3

By incorporating up to about 10% alumina in the ash, the softening point of the pellets can be increased to around 2100° F. Other additives, such as silica and dispersed clays are also effective in raising the softening point of the pellets. Such additives are desirably −200 mesh or finer.

As used herein, mesh sizes are U.S. Standard.

ATTRITION TEST PROCEDURES

Attrition tests on the densified pellets of the invention are carried out using the following procedures:

1. Accelerated Air-Jet Attrition Test

Apparatus a. A 1-liter Erlenmeyer flask with a one-inch hole cut in the bottom which is covered by a 10-mesh stainless steel screen (U.S. Standard).

b. Rotometer, for measuring the amount of dry air used for sample agitation. Air supply should be free of pressure surges.

c. Flask stopper cut concave to prevent sample dead space.

d. Standard tubing and fittings are used as needed.

e. Equipment for screen analysis, shaker, and standard screens.

f. Riffling equipment.

g. Pretreating furnace and equipment.

Preparation of Sample — A representative sample is obtained by riffling the composite specimen which has been furnished for test. The representative sample is screened to give about 200 grams of a "through No. 3 and on No. 7 mesh screen" fraction (U.S. Standard).

Procedure — In the accelerated Air-Jet Test, a 30-gram sample, as prepared aforesaid, is weighed to ±0.01 gram and placed in the inverted Erlenmeyer flask. Dry air is admitted for one hour through the jet and concave stopper at the rate of 6.1 SCFM. The air picks up the sample and throws it against the top of the flask. The air along with the particles smaller than 10 mesh escape through the 1 inch hole.

After running for one hour, the material is screened on a No. 10 screen and the remaining material weighed. The Air-Jet Test result is the percentage of charged material retained on a No. 10 screen.

Calculations — The Accelerated Air-Jet Attrition loss is determined as follows:

$$A. \text{ Air-Jet Attrition Loss} = \left[ \frac{\text{Wt. of sample charged } - \text{ Wt. remaining on No. 10 screen after test}}{\text{Wt. of sample charged}} \right] \times 100$$

B. Air-Jet Test Recovery = 100 − Attrition Loss

2. Hot Attrition Test

A quantity of about 800 grams of pellets is fluidized with 1900° F gas, raised about 20 feet to an expanded holding section, maintained therein at 1300° to 1500° F and then dropped. This treatment is repeated on a 3.2 minute cycle for 18 hours. The loss in weight of the sample during this treatment is reported as the amount lost by attrition.

The invention is illustrated in greater detail by the following procedures and examples:

GENERAL PROCEDURE

Preparation of Fly Ash

The fly ash used in this and the subsequent examples is a specimen produced by burning Illinois No. 6 coal in a commercial fluidized bed coal fired burner. Specifications of the fly ash are as follows:

| Mesh Analysis | |
|---|---|
| | Weight % |
| +10 mesh | 0.2 |
| +45 mesh | 7.5 |
| +120 mesh | 8.2 |
| +230 mesh | 0.05 |
| +325 mesh | 81.57 |
| Pan | 2.48 |
| Moisture, Wt. % | 0.09 |
| Volatile Matter, Wt. % | 7.03 (Carbon + Moisture) |

| Chemical Analysis on Moisture Free Basis | |
|---|---|
| Al | 9.4 weight % |
| Ca | 2.4 |
| Cu | 0.1 |
| Fe | 14.8 |
| Mg | 0.54 |
| K | 0.88 |
| $SiO_2$ | 45.7 |
| Ti | 0.91 |
| P as $PO_4$ | 0.46 |
| S | 2.97 |
| $CO_3$ | 0.01 |
| Cl | None |
| Na | 1.21 |

The ash is sized by passage through a sieve having a mesh runner between 25 and 48. The coarse material is rejected and the sieved fraction placed in a ball mill and tumbled until it is sufficiently pulverized to substantially pass through a 200 mesh sieve.

Tumbling is carried out in a laboratory ball mill having a capacity of about two quarts using (½ in.) porcelain balls. After about 8 to 16 hours, optimum particle size and distribution is attained.

Preparation of the Green Pellets

The sized −200 mesh fly ash aforesaid is placed in a pelletizing machine, e.g., a drum or inclined rotating pan. With the pelletizer in motion, water is added to the ash to induce pellet formation. It is essential that the pellets are formed by gradually building up layers of ash particles. If excessive water is used or it is added too rapidly, wet ash clumps having poor mechanical strength will result. This is avoided by carefully moistening the ash with a very fine water spray which is so regulated that just sufficient water is introduced to cause the ash to form into balls which then grow in size as they pick up fresh particles of dry ash. The accretion process is continued until most of the green pellets are in the size range of 4 × 6 mesh to provide the preferred size of densified particulate heat exchanger in accordance with the invention.

The green pellets are next sized and the fraction in the mesh ranges 4 × 6 or 4 × 8 retained for the subsequent heat treatment. The oversized fraction can be recovered and recycled to process by drying and crushing with fresh −25 mesh starting ash.

As previously pointed out, considerable shrinkage of the pellets occurs during the heat treatment. Accordingly, green pellets should be selected somewhat larger than required for the densified pellets. Thus, 4 × 6 mesh green pellets will yield 6 × 8 mesh final pellets.

The sized green pellets aforesaid are placed in the ball mill and tumbled to induce packing of the fly ash particles. As the ash particles are forced closer together from the pressure of tumbling, water is squeezed out of the interstitial spaces and collects as a wet film on the pellet surface. In order to prevent agglomeration, the pellets are dusted with the sized −200 mesh fly ash to absorb the water film. Tumbling and dusting is continued until the excess water has been squeezed out, generally after about 15 to 30 minutes. The amount of sized −200 mesh fly ash needed to absorb the excess water amounts to about 5 to 10% by weight of the weight of the initially formed green pellets. After the excess water has been squeezed out, the pellets normally contain about 20 to 40% residual moisture.

Drying and Heat Treatment of the Green Pellets

The green pellets aforesaid are dried to remove at least the free moisture; this is water that is not chemically bound, such as a hydrate. The drying is desirably carried out below about 300° F, preferably in the neighborhood of 200° to 250° F. A muffle furnace is used as the source of heat in laboratory preparations.

After drying, the pellets are tempered by heating them at sufficient temperature whereby there occurs a decrease in the number of crystalline entities in the pellet morphology. This enhanced uniformity of structure is manifested in the X-ray pattern of the pellet. Such condition is visually indicated by the uniform brownish color throughout the pellet structure due to conversion of the iron oxides to substantially the E − $Fe_2O_3$ form of hematite. It is during this heating period that any residual carbon in the ash should be allowed to burn off. If more than about 3 to 5% carbon remains, its presence will interfere with the final heating or sintering stage resulting in weak pellets.

In general, the conversion of the green pellets as above described is realized by heating them to within about 70 to 90% of the sintering temperature of the fly ash, normally in the range of 1000° F to 1900° F. This period of heating is continued until the above morphological changes occur, generally from about 0.5 to about 16 hours, depending on the type of fly ash and its preparation, i.e. sizing and drying conditions of the green pellets.

Following this presintering heating period, the pellets are subjected to sufficient temperature to effect sintering and thereby complete the heat treatment.

EXAMPLE 1

Following the procedure aforesaid, 200 g. of fly ash from Illinois No. 6 coal was pulverized in the ball mill until 95.6% by weight passed through a 325 mesh screen. The screened fraction was pelletized by moistening with 160g. of distilled water. As the pelletization proceeded, the 31 4+6 mesh fraction was removed and the −6 mesh portion tumbled further to promote additional pellet growth until substantially −4+6 pellets were formed. The −4+6 sized pellets were tumbled for 60 minutes while dusting periodically with 17g. of 200 mesh dry fly ash to absorb the squeezed out moisture and thereby prevent adherence of the pellets to one another.

The pellets from six runs were dried overnight in two large, unglazed porcelain dished at 110° C. In drying, the weight of the moist pellets dropped from 2175g. to 1423g. The dried pellets were then heat treated at 1400° F for 2 hours and then sintered overnight in a muffle furnace at 1900° F. The total yield of densified pellets was 1345g. 90% were in the −6+8 mesh range, the minus 8 material amounted to less than 2% by weight of the final product; see Table I for comparison data.

EXAMPLES 2 -10

These examples were carried out to show the effect on pellet density of varying the curing times at 1900° F; the carbon content of the fly ash; and a packing promoter. In all instances, the green pellets were dried at 220° F for at least 2 hours. The additive was blended with the −200 mesh ash; the amount expressed is percent by weight of the blended mixture.

Examples 2, 3 and 4 demonstrate that optimum attrition resistance and density is reached after heating 13 hours at 1900° F, although a workable pellet is obtained after only 1 hour at 1900° F.

Examples 5 and 6 were formulated from −200 mesh fly ash containing 1% by weight, based on the mixture, of bentonite. It will be observed that the bentonite results in a pellet of increased density. (Compare with 2, 3 & 4.) Moreover, bentonite apparently accelerates curing since Example 5, which was cured for only 0.5 hour exhibited good attrition resistance, i.e. 85% recovery.

Examples 7 and 8 show that for identical curing times, pellets containing 1% bentonite exhibit higher densities. In Examples 9 and 10 the −200 mesh ash was fired at 1400° F to burn off carbon prior to pelletization. Both examples gave dense pellets. With no additive the carbonfree fly ash produces considerably denser pellets than in the case of the pellets prepared from carbon containing fly ash. (Compare Example 9 density with Examples 2, 3, 4, or 7.) The test results and data for Examples 2 - 10 are summarized in Table II.

EXAMPLES 11 - 15

These examples were prepared to determine the effect on pellet strength of varying the drying and presintering heat treatments of the green pellets. The fly ash was obtained from the burning of Illinois No. 6 coal. The results are summarized in Table III. It will be noted that Example 11, which was subjected to the longest heating interval counting the drying period, exhibited the best attrition resistance. Examples 12 and 13 also showed high attrition resistance indicating that their drying and heating were sufficient. Example 14 received insufficient heat as indicated by very poor attrition resistance. This indicates that the important transformations within the pellet, i.e. reduction of crystalline entities and conversion of iron oxides to the $\alpha - Fe_2O_3$ had not been completed. Example 15 shows the necessity of the drying stage to remove at least the unbound water prior to subjecting the pellet to presintering temperatures. The pellets of Example 15 receiving such treatment were only marginally resistant to attrition and it is believed that such poor quality results from too sudden expulsion of water when the wet pellet encountered the high presintering temperatures.

EXAMPLE 16

In this example, the green pellets were dried and heat treated in a 1 foot square furnace. A 6-inch deep bed of the pellets were heated with downflow hot gas keeping the temperature below about 250° F until all moisture was removed, as indicated by thermocouples above and in the bed. Then the temperature was raised slowly between 1000° and 1600° F to permit presintering and slow burning of (7.2%) carbon such that there were no visible exotherms. The temperature was then raised to a maximum of 1850° F. The entire heating cycle required 28 minutes, and the pellets were red throughout due to conversion of the iron to $Fe_2O_3$; (the original fly ash contained 14.8 wt. percent Fe.) The resulting 4 × 6 pellets had crushing strengths of 300 psig and gave an Accelerated Air Jet Test Recovery of 91 percent.

When the pellets were not dried to remove unbound moisture, the temperature was raised rapidly to 1000° F and then heated slowly. The total heating time was 21 minutes to a maximum of 1900° F. The top layers of pellets fused and showed considerably bloating. Moreover, the interiors of the pellets were black indicating that the $Fe_3O_4$ had not been converted to $Fe_2O_3$.

TABLE I

Fly Ash Pellet Attrition Test Data

| Test Material | Accelerated Air-Jet Attrition Test; Attrition Loss, Wt. % at Ambient Temperature | Hot Attrition Test; Attrition Loss, Wt. % at 1300 to 1900° F |
|---|---|---|
| Pellets made from unsized Illinois No. 6 fly ash | 96-100 | — |
| Pellets made from Illinois No. 6 fly ash by process of the invention (Example 1) | 15-18 | 5.0 |
| Commercial Coal Ash Light Aggregate | — | 100 |
| Sand; 6 × 10 mesh (U.S. Standard) | 38-69 | 28-75 |
| Coors, Mullite, ⅛ inch pellets, commercial refractory | <1 | 1.9-6.5 |

TABLE II

Densities of Attrition-Resistant Fly Ash Pellets

| Example No. | Carbon in Fly Ash, wt. % | Additive | Curing Time at 1900° F | Results Wt. % Recovered₁ | Density of Pellets, g/cc Bulk | Particle (Water) |
|---|---|---|---|---|---|---|
| 2 | 6.94 | None | 0.5 | 71.3 | 1.02 | 1.89 |
| 3 | " | None | 1.0 | 78.3 | 0.98 | 1.88 |
| 4 | " | None | 13 | 90.7 | 1.06 | 2.01 |
| 5 | " | 1% Bentonite | 0.5 | 85.0 | 1.55 | 2.62 |
| 6 | " | 1% Bentonite | 13 | 79.0 | 1.40 | 2.55 |
| 7 | " | None | 13 | 97.0 | 1.49 | 2.56 |
| 8 | " | 1% Bentonite | 13 | 81.7 | 1.32 | 2.87 |
| 9 | 0.1 | Ashed | 13 | 72.5 | 1.33 | 3.0 |
| 10 | 0.1 | Ashed & 1% Bentonite | 13 | 76.7 | 1.51 | 2.84 |

₁Accelerated Air-Jet Attrition Test Pellets Recovered

TABLE III

Effect of Heating Times on Pellet Strengths

| Example No. | Drying Time at 212° F, Hr. | Time at 1000–1950° F, hr. | Time at 1950° F, hr. | Accelerated Air-Jet Attrition Test (% Recovered) |
|---|---|---|---|---|
| 11 | 16 | 4.5 | ½ | 87.4 |
| 12 | 4 | 3.0 | ½ | 84.4 |
| 13 | 1 | 3.0 | ½ | 83.5 |
| 14 | 1 | 0.75 | ½ | 32.7 |
| 15 | 0 | 5.0 | ½ | 73.1 |

What is claimed is:

1. A method of producing densified fly ash pellets having a specific gravity of about 2.0 to 2.3 consisting essentially of the steps
   a. sizing the fly ash to produce a fraction substantially finer than −200 mesh (U.S. Standard);
   b. moistening the sized fraction with sufficient water to form green pellets;
   c. sizing the green pellets;
   d. tumbling the sized green pellets to effect particle packing until excess water has been squeezed out, said pellets being kept dusted during tumbling with sized fly ash from step (a) to absorb the squeezed out water and thereby prevent agglomeration;
   e. drying the packed green pellets below about 300° F to remove the free water therefrom;
   f. heating the dried pellets from about 1000° F to about 70–90% of the absolute softening temperature of the ash until the iron oxides are converted substantially to the $\alpha-Fe_2O_3$ form of hematite and carbon is burned off to a residual value of no more than about 3 to 5% and;
   g. sintering the treated, dried pellets of step (f) at a temperature of 70 to 90% of the absolute softening temperature of the ash.

2. A method according to claim 1 wherein 95% of the fly ash is finer than 325 mesh.

3. A method according to claim 1 wherein the fly ash contains a slippage promating agent.

4. A method according to claim 3 wherein the slippage promoting agent is selected from the group consisting of bentonite, kaolinite, sodium silicate, a carboxyvinyl polymer, a rubber compound and sodium aluminum phosphate.

5. A method according to claim 1 wherein the fly ash contains up to about 10% of an agent for increasing the softening point of the fly ash.

6. A method according to claim 5 wherein the agent is selected from the class consisting of alumina and silica.

* * * * *

UNITED STATES PATENT OFFICE
CERTIFICATE OF CORRECTION

PATENT NO. : 4,043,831

DATED : August 23, 1977

INVENTOR(S) : Louis D. Friedman

It is certified that error appears in the above-identified patent and that said Letters Patent are hereby corrected as shown below:

Column 1, line 21 "SN" should read --SNG--; line 38 "density" should read --diameter--. Column 3, line 59 "14" should read --to--. Column 6, line 51 "31 4 + 6" should read -- -4 + 6 --; line 61 "dished" should read --dishes--. Column 7, line 26 "bonfree" should read --bon-free--. Column 10, line 19, Claim 3, "promating" should read --promoting--.

Signed and Sealed this

Twenty-ninth Day of November 1977

[SEAL]

Attest:

RUTH C. MASON
Attesting Officer

LUTRELLE F. PARKER
Acting Commissioner of Patents and Trademarks